United States Patent
Aberle

(10) Patent No.: US 10,766,816 B2
(45) Date of Patent: Sep. 8, 2020

(54) BUILDING COMPOSITION MARKER

(71) Applicant: NOURYON CHEMICALS INTERNATIONAL B.V., Arnhem (NL)

(72) Inventor: Thomas Aberle, Nottwil (CH)

(73) Assignee: NOURYON CHEMICALS INTERNATIONAL B.V., Anhem (NL)

( * ) Notice: Subject to any disclaimer, the term of this patent is extended or adjusted under 35 U.S.C. 154(b) by 0 days.

(21) Appl. No.: 16/308,019

(22) PCT Filed: Jul. 11, 2017

(86) PCT No.: PCT/EP2017/067347
§ 371 (c)(1),
(2) Date: Dec. 7, 2018

(87) PCT Pub. No.: WO2018/011180
PCT Pub. Date: Jan. 18, 2018

(65) Prior Publication Data
US 2019/0308908 A1    Oct. 10, 2019

(30) Foreign Application Priority Data

Jul. 14, 2016  (EP) ................................. 16179439

(51) Int. Cl.
| | | |
|---|---|---|
| C04B 28/02 | (2006.01) |
| C04B 24/02 | (2006.01) |
| C04B 24/38 | (2006.01) |
| C04B 24/12 | (2006.01) |
| C04B 24/26 | (2006.01) |
| C04B 24/28 | (2006.01) |
| C04B 40/00 | (2006.01) |
| C04B 111/00 | (2006.01) |

(52) U.S. Cl.
CPC ............. *C04B 28/02* (2013.01); *C04B 24/02* (2013.01); *C04B 24/123* (2013.01); *C04B 24/2641* (2013.01); *C04B 24/283* (2013.01); *C04B 24/38* (2013.01); *C04B 40/0039* (2013.01); *C04B 40/0042* (2013.01); *C04B 40/0096* (2013.01); *C04B 2111/00482* (2013.01)

(58) Field of Classification Search
CPC ....... C04B 28/02; C04B 24/02; C04B 24/123; C04B 24/2641; C04B 24/283; C04B 24/38; C04B 40/0042
USPC ........................................................ 526/348
See application file for complete search history.

(56) References Cited

U.S. PATENT DOCUMENTS

| | | |
|---|---|---|
| 3,325,105 A | 6/1967 | Veltman et al. |
| 4,473,405 A | 9/1984 | Gerber |
| 4,698,317 A | 10/1987 | Inoue et al. |
| 5,211,751 A | 5/1993 | Arfaei et al. |
| 10,065,991 B2 | 9/2018 | Taden et al. |
| 2009/0218545 A1 | 9/2009 | Mader et al. |
| 2012/0028064 A1 | 2/2012 | Perello et al. |
| 2012/0329908 A1 | 12/2012 | Chen et al. |
| 2013/0035422 A1 | 2/2013 | Freund et al. |

(Continued)

FOREIGN PATENT DOCUMENTS

| | | |
|---|---|---|
| CN | 101331093 A | 12/2008 |
| CN | 201391027 Y | 1/2010 |
| CN | 102910932 A | 2/2013 |

(Continued)

OTHER PUBLICATIONS

Mendel Friedman; "Applications of the Ninhydrin Reaction for Analysis of Amino Acids, Peptides, and Proteins to Agricultural and Biomedical Sciences"; *Journal of Agricultural and Food Chemistry*; 2004, vol. 52, pp. 385-406; American Chemical Society;XP055009377.

(Continued)

*Primary Examiner* — William K Cheung
(74) *Attorney, Agent, or Firm* — Lorenz & Kopf, LLP

(57) ABSTRACT

The invention relates to the use of a building composition marker comprising at least one alpha-amino acid, alpha-amino acid salt or a mixture thereof in a building composition. The invention also relates to a building composition comprising such a building composition marker, and to a process for producing the building composition. The invention further relates to a building composition marker comprising at least one alpha-amino acid, alpha-amino acid salt or mixture thereof, and one or more components selected from:—vinyl ester homopolymers, vinyl ester copolymers comprising one or more vinyl ester units and one or more monomer units from the group selected from olefins, vinylaromatics, vinyl halides, acrylic esters, methacrylic esters, monoesters or diesters of fumaric and/or maleic acid, or silicon-functional monomers; —(meth)acrylic ester homopolymers, (meth)acrylic ester copolymers comprising one or more (meth)acrylic ester units and one or more monomer units from the group of vinylaromatics, vinyl halides, monoesters or diesters of fumaric and/or maleic acid, or silicon-functional monomers; —homopolymers or copolymers of dienes and also of olefins, diene copolymers comprising one or more diene units and one or more monomer units from the group selected from vinyl halides, (meth)acrylic esters, esters of fumaric or maleic acid, and vinylaromatics; —homopolymers of vinylaromatics; —homopolymers of vinyl halides; and—polysaccharides, polysaccharide ethers, and mixtures thereof.

19 Claims, No Drawings

(56) References Cited

U.S. PATENT DOCUMENTS

2013/0098271 A1    4/2013    Eberwein et al.

FOREIGN PATENT DOCUMENTS

| | | |
|---|---|---|
| CN | 104609823 A | 5/2015 |
| CN | 104769437 A | 7/2015 |
| CN | 105218011 A | 1/2016 |
| DE | 102008043988 A1 | 5/2010 |
| EP | 0 160 267 A2 | 11/1985 |
| EP | 2 876 094 A1 | 5/2015 |
| EP | 2876094 A1 * | 5/2015 |
| GB | 2 029 813 A | 3/1980 |
| WO | 99/38917 A1 | 8/1999 |
| WO | 2008/091184 A1 | 7/2008 |
| WO | 2014/093421 A1 | 6/2014 |
| WO | 2015/023716 A1 | 2/2015 |
| WO | 2016/097371 A1 | 6/2016 |
| WO | 2018/011178 A1 | 1/2018 |

OTHER PUBLICATIONS

En.wikipedia.org/wiki/Ninhydrin, Feb. 2016.

Fred Senese; "What is a simple test for the presence of amino acids?"; *General Chemistry Online*; Copyright 1997-2010, last revised Aug. 17, 2015.

European Search Report issued in counterpart EP Application No. 16179439.1-1371 dated Jan. 1, 2017.

International Search Report and Written Opinion for PCT/EP2017/067347 dated Nov. 7, 2017.

EPO, Communication Pursuant to Article 94(3) EPC, dated Nov. 14, 2019.

CNIPA, Chinese Office Action issued in Application No. 201780037997.x, dated Jun. 13, 2019.

CNIPA, Chinese Office Action issued in Application No. 201780036420.7, dated Aug. 7, 2019.

\* cited by examiner

BUILDING COMPOSITION MARKER

This application is a national stage filing under 35 U.S.C. § 371 of PCT/EP2017/067347 filed Jul. 11, 2017, which claims priority to European Patent Application No. 16179439.1 filed Jul. 14, 2016, the contents of which are each incorporated herein by reference in their entireties.

The present invention relates to a building composition, a building composition marker, the use of the building composition marker, a process to mark a building composition and a method for determining the presence of the building composition marker.

Building compositions are diverse materials, and typically are composite materials, in other words comprising two or more constituent materials, wherein the constituents may have significantly different physical and/or chemical properties which, when combined, produce a material with characteristics different from the individual components, e.g. a cured, dried or hardened material. Building materials have in common that they are meant for longevity and durability.

Buildings are complex structures, which have to withstand e.g. long-term exposure to weather, drilling into the structure and e.g. refilling, or other changes during the lifetime of a building. The selection of the components of building materials has to take various requirements into consideration such as strength of the resulting structure, weight, compatibility with one or more further building compositions, or resistance to weathering. Errors in the selection of even one component of one building composition can have negative consequences for the building structure and its longevity. Errors in the choice of building compositions can lead to a variety of defects for example lack of adhesiveness of the resulting material, reduced film building properties, lack in strength, or lack in hydrophobicity, or lack in insulation.

A visual inspection of the resulting building or building part will not always be sufficient to determine the cause for potential problems of the design or workmanship. Thus, time-consuming and extensive tests are necessary to examine the defect. It would therefore be desirable to provide a simple means to determine whether the intended building composition has been used also after curing or after combination with other building compositions and materials. A further problem is the quality control of such building compositions. Building compositions come in various forms such as liquid, dry, or pasty form. The resulting material, e.g. the cured material tends to be a solid structure. These different characteristics often require different testing and it can be very difficult to determine the quality of the original composition after curing e.g. for damages resulting from the use of low quality counterfeit building compositions.

WO200891184 discloses a method for processing a mortar, comprising the steps of mixing a dry mortar mix with water, a substance influencing the solidification rate of the mortar and a marker for producing a perceptible difference between marked and unmarked fresh mortar, and thereby marking the fresh mortar containing said substance. The method further comprises the steps of maintaining the perceptible difference temporarily, bringing the perceptible difference to fade, and at least substantially removing the perceptible difference between marked and unmarked mortar. WO200891184 also relates to the use of a substance for marking a mortar, a mortar additive composition and a mortar comprising said mortar additive composition.

US20130035422 discloses a method for identifying and quantifying mass-produced goods in articles, such as construction materials containing e.g. mortars. US20130035422 discloses adding a dye-containing polymer dispersion to the mass-produced goods, wherein particles are coded by the mixture of the dyes and the polymer dispersion particles for quantitative determination. US20130035422 is interested in detecting with satisfactory reliability the type, origin and the amount used of the mass-produced material employed in the article.

It is therefore an object of the present invention to provide a simple means to determine whether the required building composition has been used. It is a further object of the invention to provide a simple method to determine whether the intended building composition has been used. It is a further object of the present invention to provide a simple means and a simple method to determine the origin of the building composition. It is a further object of the present invention to provide a simple means which does not lead to visible changes in the color of the building composition, in particular not visible to the eye. It is a further object of the present invention to provide a simple means which can be tested before and after the building composition has changed to produce its final structure.

These objects are met by the building composition according to the invention, the building composition marker according to the present invention, the use of a building composition marker according to the present invention, a process for marking building compositions, and a method for determining the presence of a building composition marker according to the present invention.

According to the invention, a building composition marker comprising at least one alpha-amino acid, alpha-amino acid salt or a mixture thereof can be used in marking building compositions.

It has been found that such a building composition marker provides a simple means to determine whether the intended building composition has been used. In the pH range of 4-8, the free alpha-amino group of the alpha-amino acid R—CH(NH2)-COOH, alpha-amino acid salt or of the mixture thereof of the building composition marker reacts with ninhydrin (2,2-dihydroxyindane-1,3-dione) to form Ruhemann's purple (diketohydrindylidenediketohydrindamine).

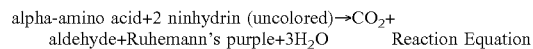

alpha-amino acid+2 ninhydrin (uncolored)→$CO_2$+ aldehyde+Ruhemann's purple+3$H_2O$    Reaction Equation Proteins or reacted alpha-amino acids, such as amino acid crosslinkers, wherein the alpha-amino group forms part of a bond, do not form visibly detectable Ruhemann's purple in the amounts of proteins or reacted alpha-amino acids typically used in building compositions.

Suitable methods of detection of the purple color include visual inspection and recording the absorbance with a spectrophotometer at the wavelength of 570 nm such as e.g. a Medispec-III UV/VIS spectrophotometer, zero-set against a blank sample. The use of a spectrophotometer allows for additional confirmation e.g. in case of highly diluted samples or very small samples.

The alpha-amino acid has the overall formula R—CH(NH2)-COOH wherein R is an organic substituent, also known as a side-chain. Suitable organic substituents include H, linear or branched alkyl, cycloalkyl, heteroalkyl, heterocycloalkyl, aromatic, and heteroaromatic substituents. The organic substituents can be charged or uncharged polar substituents, or non-polar substituents.

The salt of the alpha-amino acid has a net charge. This net charge may depend on the pH of the building composition marker and/or the building composition. The salt of the amino acid includes R—CH($NH_3^+$)—COOH, R—CH ($NH_3^+$)—COO⁻, and R—CH($NH_2$)—COO⁻. The side chains may further have a charge, said charge forms part of the net charge of the salt of the alpha-amino acid.

Suitable amino acids include Histidine, Alanine, Isoleucine, Arginine, Leucine, Asparagine, Lysine, Aspartic acid, Methionine, Cysteine, Phenylalanine, Glutamic acid, Threonine, Glutamine, Tryptophan, Glycine, Valine, Serine, Tyrosine, or mixtures thereof.

Suitable examples of salts of alpha-amino acids include Histidinate, Alaninate, Isoleucinate, Argininate, Leucinate, Asparaginate, Lysinate, Aspartate, Methioninate, Cysteinate, Selenocysteinate, Phenylalaninate, Glutamate, Threoninate, Glutaminate, Tryptophanate, Glycinate, Valinate, Serinate, Tyrosinate, or mixtures of two or more thereof. The salt of the alpha amino acid is preferably an alkali salt, earth alkali salt or a mixture thereof.

A building composition can comprise a building composition marker, in which the building composition marker comprises at least one alpha-amino acid, alpha-amino acid salt or a mixture thereof. The building composition according to the invention typically comprises less than 3 wt % of proteins, such as casein, based on the total weight of the building composition.

Suitable building compositions are used for construction purposes. Suitable building compositions are composite materials comprising two or more constituent materials, which when combined, produce materials with characteristics different from the individual components. The building materials may be in dry form or comprise a solvent. The preferred solvent is water. The building compositions according to the invention comprise solvent, preferably water, prior to their application and are subsequently transformed to a dry material, e.g. by way of drying or curing.

Suitable constituent materials include at least one binder, at least one particulate material, and/or at least one reinforcement material.

Suitable binders are compounds holding the particulate materials together in a coherent mass and include vinyl ester homopolymers, vinyl ester copolymers, (meth)acrylic ester homopolymers, and (meth)acrylic ester copolymers. Further suitable binders include hydraulically setting binders, latent hydraulic binders, pozzolanic binders, non-hydraulic binders, or mixtures thereof.

Suitable particulate materials include carbonates, pigments, chalk, quartz sand, calcium carbonate, limestone, dolomite, basalt, perlite, vermiculite, clay, such as expanded or sintered clay, lime hydrate, silica sand, chalk, white lime hydrate, talc, mica, fumed silica, polystyrene granules, rubber granules, and mixtures thereof.

Suitable reinforcement materials include fibers, such as natural fibers, synthetic fibers, glass fibers, and carbon fibers.

Suitable examples of composite materials include polymer composite materials, fiber composite materials and/or particulate composite materials, such as cement.

Examples of suitable building compositions include construction adhesives, mortars, plasters, renders, filling compounds, flooring compounds, leveling compounds, grouts, jointing mortars, or concrete modifiers, paints, gypsum based materials, thermal insulation composite system adhesives or tile adhesives.

The building composition marker may optionally further comprise one or more polymers selected from vinyl ester homopolymers, vinyl ester copolymers comprising one or more vinyl ester units and one or more monomer units from the group selected from olefins, vinylaromatics, vinyl halides, acrylic esters, methacrylic esters, monoesters or diesters of fumaric and/or maleic acid, or silicon-functional comonomers; (meth)acrylic ester homopolymers, (meth)acrylic ester copolymers comprising one or more (meth)acrylic ester units and one or more monomer units from the group of vinylaromatics, vinyl halides, monoesters or diesters of fumaric and/or maleic acid, or silicon-functional monomers; homopolymers or copolymers of dienes and also of olefins, diene co-polymers comprising one or more diene units and one or more monomer units from the group selected from vinyl halides, (meth)acrylic esters, esters of fumaric or maleic acid, and vinylaromatics; homopolymers of vinylaromatics; and homopolymers of vinyl halides. This has the additional advantage of easy dosage and homogenous distribution of the building composition marker according to the invention to the building composition. A further additional advantage is that it is possible to also determine that the suitable polymer constituent is added to the building composition.

Co-polymers within the meaning of the invention include co-polymers comprising two or more different monomers or monomer units. Examples of suitable co-polymers include bipolymers, ter-polymers, and quaterpolymers.

Suitable vinyl ester monomers include vinyl esters of carboxylic acids having 1 to 15 C atoms. Preferred are vinyl acetate, vinyl propionate, vinyl butyrate, vinyl 2-ethylhexanoate, vinyl laurate, 1-methylvinyl acetate, vinyl pivalate, and vinyl esters of alpha-branched monocarboxylic acids having 9 to 11 C atoms, such as vinyl versatate, for example VeoVa™ 9, VeoVa™ 10, VeoVa™ 11 (trade names of the company Hexion).

Suitable examples of suitable vinyl ester co-polymers include co-polymers comprising one or more vinyl ester units and one or more monomer units from the group encompassing olefins, vinylaromatics, vinyl halides, acrylic esters, methacrylic esters, monoesters or diesters of fumaric and/or maleic acid, or silicon-functional monomers; Suitable examples of vinyl ester co-polymers include ethylene (E) vinyl acetate (VA) co-polymers (EVA polymers) and ter-polymers further comprising vinyl chloride (VC) (VA/E/VC polymers), or vinyl acetate (VA) versatate (VeoVa) based polymers such as (VA/VeoVa polymers).

Suitable monomers from the group of acrylic esters or methacrylic esters include esters of unbranched or branched alcohols having 1 to 15 C atoms. Preferred methacrylic esters or acrylic esters include methyl acrylate, methyl methacrylate, ethyl acrylate, ethyl methacrylate, propyl acrylate, propyl methacrylate, n-butyl acrylate, n-butyl methacrylate, tert-butyl acrylate, tert-butyl methacrylate, and 2-ethylhexyl acrylate. Particularly preferred are methyl acrylate, methyl methacrylate, n-butyl acrylate, tert-butyl acrylate, and 2-ethylhexyl acrylate.

Olefin monomers have the general formula $C_nH_{2n}$. Suitable olefin monomers include ethylene, propylene and mixtures thereof. Diene monomers are hydrocarbons containing two carbon double bonds. Suitable diene monomers include 1,3-butadiene, isoprene and mixtures thereof.

Suitable vinylaromatic monomers include styrene, methylstyrene, and vinyltoluene.

Suitable vinyl halide monomers are alkene monomers with at least one halide substituent bonded directly on one of the alkene carbons. Suitable halide substituents are Cl, Br, and/or I. A preferred vinyl halide is vinyl chloride.

Suitable examples of vinyl chloride co-polymers include olefins, such as ethylene or propylene, and/or vinyl esters, such as vinyl acetate, vinyl laurate, or vinyl esters of a branched carboxylic acid having 9 to 11 C atoms, and/or acrylic esters and/or methacrylic esters of alcohols with 1 to 15 C atoms, such as methyl acrylate and methyl methacrylate, ethyl acrylate, ethyl methacrylate, propyl acrylate, propyl methacrylate, n-butyl-acrylate, tert-butyl acrylate, n-butyl methacrylate, tert-butyl methacrylate, 2-ethylhexyl acrylate and/or monoesters or diesters of fumaric and/or maleic acid, such as the dimethyl, methyl tert-butyl, di-n-butyl, di-tert-butyl, and diethyl esters of maleic and/or fumaric acid.

Suitable examples of silicon-functional monomers include silanes, polymethylhydrogensiloxanes, siloxane resins, polysilanes, organosilanols, disiloxanes, oligosiloxanes, polysiloxanes, and organosiliconates. Further suitable examples include vinylsilanes and methacryloxysilanes, such as acryloyloxypropyltri(alkoxy)silanes, methacryloyloxypropyltri(alkoxy)silanes, vinyltrialkoxysilanes, and vinylmethyldialkoxysilanes.

The polymer is generally prepared in an aqueous medium and preferably by an emulsion or suspension polymerization process such as the process described in DE-A 102008043988. Protective colloids and/or emulsifiers may be used during the polymerization. The obtained polymers are in the form of aqueous dispersions and can be converted, as described in DE-A 102008043988, into corresponding redispersible powders, e.g. by spray-drying. In this case, a drying aid may be used, in a total amount of 3% to 30% by weight, preferably 5% to 20% by weight, based on the polymeric constituents of the dispersion. Preferred drying aids are protective colloids, such as polyvinyl alcohols, polyvinyl-lpyrrolidone, and cellulose ethers.

The building composition marker may optionally comprise one or more polysaccharides, polysaccharide ethers, and mixtures thereof. Suitable polysaccharides include homopolysaccharides and heteropolysaccharides. Suitable examples of polysaccharides include cellulose, starch, guar gum, alginates, chitin, hemicelluloses, and tamarind. Suitable polysaccharide ethers include starch ethers, cellulose ethers, and guar ethers, chitin ethers, hemicellulose ethers, alginate ethers, tamarind ethers and mixtures of two or more thereof. The polysaccharide ethers, preferably the cellulose ethers and the guar ethers, preferably include alkyl, hydroxyalkyl and/or carboxymethyl ethers. Suitable alkyl groups include methyl, ethyl, propyl and/or C4- to C30-alkyl groups. Suitable hydroxyalkyl groups include hydroxyethyl and/or hydroxypropyl groups. The polysaccharides and polysaccharide ethers may be used as rheology modifiers. This has the additional advantage that it can further be determined whether the intended rheology modifier has been used.

The building composition marker may be in dry form. This has the additional advantage of easy storage, transport and handling.

The building composition marker has various uses in building composition applications, including the use in construction adhesives, mortars, plasters, renders, filling compounds, flooring compounds, leveling compounds, grouts, jointing mortars, or concrete modifiers, paints, gypsum based materials, thermal insulation composite system adhesives or tile adhesives.

In embodiments, building composition marker is used in a curable building composition, e.g. one comprising a hydraulic binder, a latent hydraulic binder or a non-hydraulic binder. In such embodiments, the alpha-amino acid and/or alpha-amino acid salt of the building composition marker is preferably not chemically bound by covalent bonds to other components in the uncured building composition.

The invention further relates to a process for marking building compositions comprising the step of adding a building composition marker comprising at least one alpha-amino acid, alpha-amino acid salt or a mixture thereof to a building composition. The process for marking building compositions may further comprise a step wherein the building composition marker is added to a dry building composition, a building composition in the form of a slurry, a solution, a dispersion, or an emulsion.

The invention further relates to a method for determining the presence of a building composition marker in a building composition, comprising the steps of:
  a) taking a sample of the building composition
  b) mixing the sample with ninhydrin (reaction mixture).
  Step a) may optionally comprise grinding the sample.

The method for determining the presence of the building composition marker may further comprise an optional step a1) comprising mixing the sample with a polar solvent.

The method may further comprise optional step a2) comprising the separation of a liquid phase obtained in step a1).

In an embodiment, the method according to the invention thus comprises the steps:
  a) taking a sample of the building composition
  a1) mixing the sample with a polar solvent
  a2) separating a liquid phase obtained in step a1)
  b) mixing the sample with ninhydrin (reaction mixture)

The ninhydrin of step b) may be in dry form or in the form a solution. The preferred solvent for the ninhydrin solution is water.

The polar solvent of optional step a1) includes protic polar solvents such as water.

The method according to the invention may further include an optional step a3) comprising adjusting the pH of the liquid phase to a pH in the range of from 4 to 8.

The method my further comprise optional step a4), wherein the liquid phase is concentrated. Suitably, the concentration step is performed by heating the pH 4-8 liquid phase of step a3) prior to mixing the pH 4-8 liquid phase with the ninhydrin in step b). This step has the additional advantage that very low amounts of alpha-amino acid can be visibly detected.

In a further embodiment, the method according to the invention thus comprises the steps:
  a) taking a sample of the building composition
  a1) mixing the sample with a polar solvent
  a2) separating a liquid phase obtained in step a1)
  a3) adjusting the pH of the liquid phase to a pH in the range of from 4 to 8.
  a4) optionally concentrating the liquid phase
  b) mixing the sample with ninhydrin (reaction mixture)

The method according to the invention may further comprise an optional step c) comprising heating the reaction mixture of step b).

The method may further comprise the optional additional step d) comprising measuring the light absorption of the reaction mixture of step b) or step c). This step has the additional advantage that very low amounts of alpha-amino acid can be detected e.g. in case of doubt by way of visual inspection.

The method may further comprise the optional additional step e) of determining the polymer composition by way of IR spectrometry. This step can be performed on the sample of step a), the sample mixed with the polar solvent in step a1), the liquid phase obtained in optional step a2), a3) or a4) or on the reaction mixture of step b). This step has the additional advantage that the specific polymer composition of the building composition can additionally be determined.

The method may further comprise the optional additional step f) of identifying the at least one alpha-amino acid, the alpha-amino acid salt, or the mixture thereof by way of chromatography. Suitable chromatography methods include high performance liquid chromatography (HPLC) and gas chromatography.

This step can be performed on the sample of step a), the sample mixed with the polar solvent in step a1), the liquid phase obtained in optional step a2), a3) or a4) or on the reaction mixture of step b).

This step has the additional advantage that the specific at least one alpha-amino acid, alpha-amino acid salt, or the mixture thereof used in the building composition can be further identified. This step has the additional advantage that it allows for further accuracy in determining the origin of the building composition.

The method may be applied to a plurality of building compositions, in particular to layers of building compositions, such as a mortar layer coated with a paint. The samples can be taken layer by layer and each sample can be tested individually.

EXAMPLES

Ninhydrin Test

1. Ninhydrin Solution Preparation

For the Ninhydrin test using the Ninhydrin solution, Ninhydrin puriss. from Riedel-de Haen was used. A 1 wt % aqueous solution of Ninhydrin was prepared for the tests by dissolving 1 wt % Ninhydrin puriss. in deionized water based on the total weight of the Ninhydrin solution.

1.1. Ninhydrin Reaction

Positive ninhydrin reaction results (referred to as ninhydrin test result) are listed as purple, negative ninhydrin reaction results as uncolored or as "no color change" in the Tables below.

1.2. Dry Cementitious Building Composition Base Mix

TABLE 1

| Dry cementitious building composition base mix for testing | |
|---|---|
| CEM I | 20 wt % based on the total weight of the cementitious building composition base mix |
| Calcium Carbonate (Durcal 65) | 79.6% based on the total weight of the cementitious building composition base mix |
| Cellulose ether Bermocoll M 70 | 0.4% based on the total weight of the cementitious building composition base mix |

1.3. Preparation of the Cementitious Building Composition for Testing

Cementitious building compositions comprising varying amounts of glycine were prepared by mixing 100 g of the dry cementitious building composition base mix with varying amounts of glycine. In addition, varying amounts of varying polymers were added. The amounts and the polymers tested are listed below in the text and in Table 3. Comparative examples may contain polymer but do not contain glycine (blank sample).

1.4. Ninhydrin Test for Alpha-Amino Acids in Cementitious Building Compositions 1.4.1. Sample Preparation for Ninhydrin Test Using the Ninhydrin Solution 30 g of the dry cementitious building composition base mix were mixed with 30 g deionized water and left standing for 30 minutes. A 5 ml sample was taken of the clear supernatant. The pH of the sample was adjusted to pH 7 using 0.1 mol/l HCl (from Merck ("Titrisol")). 1 ml of the pH 7 supernatant was added to 1 ml ninhydrin solution and heated in a 90° C. water bath for 2-3 minutes. The sample was inspected visually for the formation of Ruhemann's purple indicating the presence of glycine in the sample.

1.4.2. Comparison of Cementitious Building Compositions Containing 0 wt % Glycine and Various Amounts of Glycine 1.4.2.1. EVA Polymer Tg (Midpoint −5° C. (DSC)

The cementitious building composition contained 2 wt % of an EVA redispersible polymer powder, Tg (Midpoint −5° C. (DSC, Perkin Elmer, Type: Pyris 6 DSC, heating rate: 10 K/min. The Tg (Midpoint) of the polymer was determined according to ASTM D3418-82(1988)e1)).

The amount of glycine is based on the total weight of the cementitious building composition. The amounts are listed in Table 2. The glycine was not visible to the eye in the cementitious building composition by visible inspection prior to adding the ninhydrin solution. The addition of the glycine thus did not lead to visible changes in the color of the cementitious building composition.

The ninhydrin test results show that low amounts of glycine can be determined by visual inspection.

TABLE 2

| Amount of glycine in wt % | Ninhydrin test result |
|---|---|
| 0 (Blank sample) | Uncolored |
| 0.05 | Purple |
| 0.03 | Purple |
| 0.02 | Purple |
| 0.01 | Purple |

1.4.3. Ninhydrin Test of a Dry Cementitious Building Composition and of Said Cementitious Building Composition After Curing The cementitious building composition contained 2 wt % of an EVA polymer powder, Tg (Midpoint) −5° C. (DSC).

The dry cementitious building composition was tested as described above under 1.4.1 (Sample preparation for ninhydrin test using the ninhydrin solution).

Various amounts of glycine were added to the cementitious building composition as listed in Table 3 below. Further, various amounts of an EVA polymer powder, Tg (Midpoint −5° C. (DSC)) were added as listed in Table 3 below. The glycine was not visible to the eye in the cementitious building composition by visible inspection prior to adding the ninhydrin solution. The addition of the glycine thus did not lead to visible changes in the color of the cementitious building composition.

1.4.4. The cured cementitious building composition was prepared as follows:

Samples of the resulting dry cementitious building compositions were mixed with 20 wt % of water based on the total weight of the dry cementitious building composition. The resulting cementitious building composition slurry was applied on a PE sheet and allowed to cure and dry for 7 days at 23° C., 50% relative humidity. Thereafter, the samples were ground and tested as described above under 1.4.1 Sample preparation for ninhydrin test using the ninhydrin solution.

TABLE 3

| Amount of glycine and amount of casein in wt % | Amount of EVA polymer in wt % | Ninhydrin test result of Dry Cementitious building composition | Ninhydrin test result of Cured Cementitious building composition |
|---|---|---|---|
| 0 (Blank sample) | 0 | Uncolored | Uncolored |
| 0.05 Glycine | 0 | Purple | Purple |
| 0.03 Glycine | 2 | Purple | Purple |
| 0.05 Glycine | 3 | Purple | Purple |
| 0.1 Glycine | 0 | Purple | Purple |
| 0.5 Casein (comparative sample) | 0 | Uncolored | Uncolored |

The ninhydrin test results show the presence of the glycine both in the dry cementitious building composition and in the cured cementitious building composition. The presence of the glycine can be tested before and after the cementitious building composition had changed to produce its final cured structure.

In addition, a cementitious building composition containing 0.5 wt % casein instead of glycine was tested. The ninhydrin test was negative.

1.4.5. Ninhydrin Test of Cementitious Building Compositions Including the Optional Concentration Step The cementitious building composition contained 2 wt % EVA polymer powder Tg (Midpoint) −5° C. (DSC) based on the total weight of the cementitious building composition.

Various amounts of glycine, based on the total weight of the cementitious building composition were added as listed below in Table 4. The glycine was not visible to the eye in the cementitious building composition by visible inspection prior to adding the ninhydrin solution. The addition of the glycine thus did not lead to visible changes in the color of the cementitious building composition.

For the ninhydrin test including the optional concentration step, 100 g of the dry cementitious building composition were mixed with 100 g deionised water and left standing for 30 minutes. A 20 ml sample was taken of the clear supernatant. The pH of the sample was adjusted to pH 7 using 0.1 mol/l HCl.

The pH 7 supernatant was concentrated using a rotary evaporator (Buchi Rotavapor R-124 equipped with Buchi waterbath B-480) to 10% of the original volume.

1 ml of the concentrated pH 7 supernatant was added to 1 ml ninhydrin solution and heated in a 90° C. water bath for 2-3 minutes. The samples were inspected visually for the formation of Ruhemann's purple indicating the presence of glycine in the sample.

TABLE 4

| Amount of glycine in wt % | Ninhydrin test result |
|---|---|
| 0.01 | Purple |
| 0.005 | Purple |

The ninhydrin test results show that low amounts of glycine can be determined by visual inspection.

1.4.6. Cementitious Building Composition Containing a VA/VeoVa Polymer

The cementitious building composition was prepared by adding 2 wt %, based on the total weight of the cementitious building composition, of VA/VeoVa polymer powder Tg (Midpoint) of +18° C. to the cementitious building composition base mix.

Various amounts of glycine were added, the amounts in wt % based on the total weight of the cementitious building composition are listed in Table 5. The glycine was not visible to the eye in the cementitious building composition by visible inspection prior to adding the ninhydrin solution. The addition of the glycine thus did not lead to visible changes in the color of the cementitious building composition.

TABLE 5

| Amount of glycine in wt % | Ninhydrin test result |
|---|---|
| 0.009 | Purple |
| 0.017 | Purple |
| 0.03 | Purple |
| 0.085 | Purple |

1.4.7. Cementitious Building Composition Containing a VA/E/VC Polymer

The cementitious building composition was prepared by adding 2 wt %, based on the total weight of the cementitious building composition, of a VA/E/VC polymer powder Tg (Midpoint) of +15° C. (DSC) to the cementitious building composition base mix.

Various amounts of glycine were added, the amounts in wt % based on the total weight of the cementitious building composition are listed in Table 6. The glycine was not visible to the eye in the cementitious building composition by visible inspection prior to adding the ninhydrin solution. The addition of the glycine thus did not lead to visible changes in the color of the cementitious building composition.

The ninhydrin test result show that low amounts of glycine can be determined by visual inspection.

TABLE 6

| Amount of glycine in wt % | Ninhydrin test result |
|---|---|
| 0 | Uncolored |
| 0.05 | Purple |
| 0.5 | Purple |

1.5. Comparison of Polymer Plaster Building Compositions Containing 0 wt % Glycine and Various Amounts of Glycine

TABLE 7

| Dry polymer plaster composition base mix | |
|---|---|
| Calcium Carbonate (Durcal 65) | 99.6 wt % based on the total weight of dry polymer plaster composition base mix |
| Cellulose ether Bermocoll M 70 | 0.4 wt % based on the total weight of dry polymer plaster composition base mix |

1.5.1. Preparation of the Polymer Plaster Building Compositions for Testing

The polymer plaster building composition was prepared by adding 2 wt %, based on the total weight of the polymer plaster building composition, to the polymer plaster building composition base mix. Various amounts of glycine were added, the amounts in wt % based on the total weight of the polymer plaster building composition are listed in Table 8. The glycine was not visible to the eye in the polymer plaster building composition by visible inspection prior to adding the ninhydrin solution. The addition of the glycine thus did not lead to visible changes in the color of the polymer plaster building composition.

1.5.2. Sample Preparation for Ninhydrin Test Using the Ninhydrin Solution 30 g of the dry polymer plaster composition were mixed with 30 g deionized water and left standing for 30 minutes. A 5 ml sample was taken of the clear supernatant. 1 ml of the supernatant was added to 1 ml ninhydrin solution and heated in a 90° C. water bath for 2-3 minutes. The sample was inspected visually for the formation of Ruhemann's purple indicating the presence of glycine in the sample.

1.5.3. Ninhydrin Test of a Dry Polymer Plaster Building Composition Base Mix

The polymer plaster building composition contained 2 wt % of various polymer powders as listed in Table 8 below.

TABLE 8

| Amount of Glycine in wt % | Type of polymer | Tg, mid in °C. of polymer | Ninhydrin test result of polymer plaster composition |
|---|---|---|---|
| 0 (Blank sample) | VA | 40 | Uncolored |
| 0 (Blank sample) | EVA | 20 | Uncolored |
| 0.1 | VA | 40 | Purple |
| 0.05 | EVA | 20 | Purple |
| 0.03 | VA/VeoVa | 18 | Purple |

The ninhydrin test results show that low amounts of glycine can be determined by visual inspection.

2. Comparison of Paint Building Compositions Containing 0 wt % Glycine and Various Amounts of Glycine 2.1. Dispersion Paint—White 2.1.1. Preparation of a Paint Building Composition for Testing The white paint building composition for the testing was AkzoNobel Herbol Zenit Power (white) (aqueous wall paint according to DIN EN 13300). The white paint building composition main constituent materials are polyvinyl acetate (binder), $TiO_2$ (pigment), Dolomit (filler), $CaCO_3$ (filler), water, additives, and preservatives.

0.1 g glycine (dry) was mixed with 100 g of the white paint building composition. The glycine was not visible to the eye in the white paint building composition by visible inspection prior to adding the ninhydrin. The addition of the glycine thus did not lead to visible changes in the color of the white paint building composition.

The comparative example was prepared accordingly, however, no glycine was added to the comparative example (blank sample).

2.1.2. Ninhydrin Test Using the Ninhydrin Solution 1 g of the paint sample containing the glycine was mixed with 1 ml of the 1% ninhydrin solution. The sample was heated in a 90° C. water bath for 2-3 minutes. 1 g of the blank sample was treated accordingly.

TABLE 9

| Amount of glycine in wt % | Ninhydrin test result |
|---|---|
| 0 (blank sample) | No color change, the paint remained white |
| 0.01 | Purple |

The ninhydrin test results show that low amounts of glycine can be determined by visual inspection.

2.1.3. Ninihydrin in Dry Form 1 g of the paint sample containing the glycine was mixed with 0.01 g ninhydrin (dry) (Ninhydrin puriss. from Riedel-de Haen). The sample was heated in a 90° C. water bath for 2-3 minutes. The comparative example of 1 g of the white paint building composition without the addition of the glycine was treated accordingly (blank sample).

TABLE 10

| Amount of glycine in wt % | Ninhydrin test result |
|---|---|
| 0 (blank sample) | No color change, the paint remained white |
| 0.01 | Purple |

The ninhydrin test results show that low amounts of glycine could be determined by visual inspection.

2.2. Dispersion Paint—Dark Grey 2.2.1. Preparation of a Paint Building Composition for Testing The paint building composition for the testing was AkzoNobel Herbol Zenit Power (white) (aqueous wall paint according to DIN EN 13300). 95 wt % Herbol Zenit Power white paint building composition was modified with 5 wt % Pintasol E-WL8 (Mixol, 73230 Kirchheim), resulting in a dark grey paint building composition. The constituent materials of the composition Pintasol E-WL8 are pigment black 7, $CaCO_3$ (filler), in aqueous polyglycol- and 1,2-propanediol dispersion (binder)

0.1 g glycine (dry) was mixed with 100 g of the dark grey paint building composition. The glycine was not visible to the eye in the dark grey paint building composition by visible inspection prior to adding the ninhydrin solution. The addition of the glycine thus did not lead to visible changes in the color of the dark grey paint building composition.

The glycine containing sample was diluted 1:10 with water and was left standing for 30 minutes. A supernatant of 1 ml was separated.

The comparative example was prepared accordingly; however, no glycine was added to the comparative example (blank sample).

2.2.2. Ninhydrin Test Using the Ninhydrin Solution 1 g of the paint sample containing the glycine was mixed with 1 ml of the 1% ninhydrin solution. The sample was heated in a 90° C. water bath for 2-3 minutes. 1 g of the blank sample was treated accordingly.

2.2.3. Ninhydrin Test Using the Ninhydrin Solution 1 g of the paint sample containing the glycine was mixed with 1 ml of the 1% ninhydrin solution. The sample was heated in a 90° C. water bath for 2-3 minutes. The comparative example of 1 g of the paint without the addition of the glycine was treated accordingly (blank sample).

TABLE 11

| Amount of glycine in wt % | Ninhydrin test result |
|---|---|
| 0 (blank sample) | No color change of the supernatant |
| 0.01 | Purple |

The ninhydrin test results show that low amounts of glycine can be determined by visual inspection.

As can be seen from the ninhydrin tests, the addition of glycine can be used to determine the origin of the building composition by distinguishing between a marked and an unmarked building composition. It has further been shown that the glycine is a simple means to determine whether the intended building composition has been used by distinguishing between a marked and an unmarked building composition.

The invention claimed is:

1. A method for determining the origin of a building composition, the method comprising:
   including a building composition marker in the building composition, wherein the building composition marker comprises at least one alpha-amino acid, alpha-amino acid salt or a mixture thereof as a marker for determining the origin of a building composition; and
   adding a test composition to the building composition and reacting the test composition with the building composition marker to cause a visibly detectable color change.

2. The method according to claim 1, wherein the building composition is a composite material comprising:
   at least one binder,
   at least one particulate material, and/or
   at least one reinforcement material.

3. The method according to claim 1, wherein the building composition is selected from construction adhesives, mortars, plasters, renders, filling compounds, flooring compounds, leveling compounds, grouts, jointing mortars, or concrete modifiers, paints, gypsum based materials, thermal insulation composite system adhesives or tile adhesives.

4. The method according to claim 1, wherein the building composition marker further comprises:
   (i) one or more polymers selected from
      vinyl ester homopolymers, vinyl ester copolymers comprising one or more vinyl ester units and one or more monomer units from the group selected from olefins, vinylaromatics, vinyl halides, acrylic esters, methacrylic esters, monoesters or diesters of fumaric and/or maleic acid, or silicon-functional monomers;
      (meth)acrylic ester homopolymers, (meth)acrylic ester copolymers comprising one or more (meth)acrylic ester units and one or more monomer units from the group of vinylaromatics, vinyl halides, monoesters or diesters of fumaric and/or maleic acid, or silicon-functional monomers;
      homopolymers or copolymers of dienes and also of olefins, diene copolymers comprising one or more diene units and one or more monomer units from the group selected from vinyl halides, (meth)acrylic esters, esters of fumaric or maleic acid, and vinylaromatics;
      homopolymers of vinylaromatics; or
      homopolymers of vinyl halides; and/or
   (ii) one or more polysaccharides, polysaccharide ethers, and mixtures thereof.

5. The method according to claim 1 further comprising:
   drying or curing the building composition to form a structure; and
   obtaining a sample from the structure; wherein adding the test composition to the building composition comprises adding the test composition to the sample.

6. The method according to claim 1, wherein including a building composition marker in the building composition comprises adding the building composition marker a dry building composition, a building composition slurry, a building composition solution, a building composition dispersion, or a building composition emulsion.

7. A method for determining the presence of a building composition marker in a building composition, comprising the steps of:
   a) taking a sample of the building composition; and
   b) mixing the sample with ninhydrin.

8. The method of claim 7 wherein the building composition marker comprises at least one alpha-amino acid, alpha-amino acid salt or a mixture thereof.

9. The method of claim 8 wherein the building composition is selected from composite materials comprising at least one binder, at least one particulate material, and/or at least one reinforcement material.

10. The method of claim 8 wherein the building composition is selected from construction adhesives, mortars, plasters, renders, filling compounds, flooring compounds, leveling compounds, grouts, jointing mortars, or concrete modifiers, paints, gypsum based materials, thermal insulation composite system adhesives or tile adhesives.

11. The method of claim 7, wherein the building composition marker comprises:
   at least one alpha-amino acid, alpha-amino acid salt or a mixture thereof as a marker for determining the origin of a building composition;
   (i) one or more polymers selected from
      vinyl ester homopolymers, vinyl ester copolymers comprising one or more vinyl ester units and one or more monomer units from the group selected from olefins, vinylaromatics, vinyl halides, acrylic esters, methacrylic esters, monoesters or diesters of fumaric and/or maleic acid, or silicon-functional monomers;
      (meth)acrylic ester homopolymers, (meth)acrylic ester copolymers comprising one or more (meth)acrylic ester units and one or more monomer units from the group of vinylaromatics, vinyl halides, monoesters or diesters of fumaric and/or maleic acid, or silicon-functional monomers;
      homopolymers or copolymers of dienes and also of olefins, diene copolymers comprising one or more diene units and one or more monomer units from the group selected from vinyl halides, (meth)acrylic esters, esters of fumaric or maleic acid, and vinylaromatics;
      homopolymers of vinylaromatics; or
      homopolymers of vinyl halides; and/or
   (ii) one or more polysaccharides, polysaccharide ethers, and mixtures thereof.

12. The method of claim 7, further comprising after mixing the sample with ninhydrin visually inspecting the sample for the formation of Ruhemann's purple.

13. The method of claim 7, further comprising—before taking the sample of the building composition—curing, drying or hardening the building composition.

14. The method of claim 7, wherein the building composition marker comprises at least one alpha-amino acid, alpha-amino acid salt or a mixture thereof as a marker for determining the origin of a building composition.

15. The method of claim 1 wherein the building composition marker comprises at least one alpha-amino acid salt.

16. The method of claim 1 wherein the test composition comprises ninhydrin and wherein the visibly detectable color change is a color change to purple.

17. A building composition origin determination kit comprising:
   a building composition;
   a building composition marker included in the building composition, wherein the building composition marker comprises at least one alpha-amino acid, alpha-amino acid salt or a mixture thereof as a marker for determining the origin of the building composition; and
   a test composition selected for reaction with the building composition marker to cause a visibly detectable color change in the building composition, wherein the test composition comprises ninhydrin.

18. The building composition origin determination kit of claim 17 wherein the building composition is a composite material comprising:
   at least one binder,
   at least one particulate material, and/or
   at least one reinforcement material.

19. The building composition origin determination kit of claim 17 wherein the building composition marker further comprises:
   (i) one or more polymers selected from
      vinyl ester homopolymers, vinyl ester copolymers comprising one or more vinyl ester units and one or more monomer units from the group selected from olefins, vinylaromatics, vinyl halides, acrylic esters, methacrylic esters, monoesters or diesters of fumaric and/or maleic acid, or silicon-functional monomers;
      (meth)acrylic ester homopolymers, (meth)acrylic ester copolymers comprising one or more (meth)acrylic ester units and one or more monomer units from the group of vinylaromatics, vinyl halides, monoesters or diesters of fumaric and/or maleic acid, or silicon-functional monomers;
      homopolymers or copolymers of dienes and also of olefins, diene copolymers comprising one or more diene units and one or more monomer units from the group selected from vinyl halides, (meth)acrylic esters, esters of fumaric or maleic acid, and vinylaromatics;
      homopolymers of vinylaromatics; or
      homopolymers of vinyl halides; and/or
   (ii) one or more polysaccharides, polysaccharide ethers, and mixtures thereof.

* * * * *